United States Patent
Glime

(10) Patent No.: US 10,315,939 B2
(45) Date of Patent: *Jun. 11, 2019

(54) DIAPHRAGM VALVE WITH DIAPHRAGM SEAT CARRIER

(71) Applicant: Swagelok Company, Solon, OH (US)

(72) Inventor: William H. Glime, Chagrin Falls, OH (US)

(73) Assignee: Swagelok Company, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/455,384

(22) Filed: Mar. 10, 2017

(65) Prior Publication Data

US 2017/0184207 A1 Jun. 29, 2017
US 2019/0107213 A9 Apr. 11, 2019

Related U.S. Application Data

(63) Continuation of application No. 14/169,298, filed on Jan. 31, 2014, now Pat. No. 9,863,542.
(Continued)

(51) Int. Cl.
*F16K 7/17* (2006.01)
*F16K 7/12* (2006.01)
(Continued)

(52) U.S. Cl.
CPC ............. *C02F 1/722* (2013.01); *C02F 1/325* (2013.01); *C02F 1/20* (2013.01); *C02F 1/42* (2013.01);
(Continued)

(58) Field of Classification Search
CPC ..................................... F16K 7/17; F16K 7/12
(Continued)

(56) References Cited

U.S. PATENT DOCUMENTS 3,405,907 A 10/1968 Kayser
3,874,636 A 4/1975 Bake et al.
(Continued)

FOREIGN PATENT DOCUMENTS

WO 02/065003 8/2002
WO WO 02065003 A2 * 8/2002 ............... F16K 7/16

OTHER PUBLICATIONS

International Search Report and Written Opinion from PCT/US14/13998 dated Jun. 27, 2014.

*Primary Examiner* — Robert Clemente
*Assistant Examiner* — Akash K Varma
(74) *Attorney, Agent, or Firm* — Calfee, Halter & Griswold LLP

(57) ABSTRACT

A diaphragm valve includes a valve body, a valve assembly disposed to seal the valve cavity and including a diaphragm and a valve seat retained with a seat carrier, a threaded member assembled with the valve body, and a valve actuator assembled with the valve body and operable to move a surface of the diaphragm into and out of contact with the valve seat. The valve body includes a valve cavity, a first port and a second port, with the first port and the second port being open to the valve cavity. The threaded member includes an annular bead that directly contacts the diaphragm to apply a compressive load to the diaphragm against a first side of the seat carrier. The valve actuator is separate from the threaded member, and is removable from the valve body without removing the threaded member from the valve body.

21 Claims, 4 Drawing Sheets

FIG. 2

Related U.S. Application Data

(60) Provisional application No. 61/759,705, filed on Feb. 1, 2013.

(51) Int. Cl.
  C02F 1/72 (2006.01)
  C02F 1/32 (2006.01)
  C02F 1/20 (2006.01)
  C02F 1/42 (2006.01)
  C02F 1/44 (2006.01)
  C02F 1/469 (2006.01)
  C02F 1/66 (2006.01)
  C02F 103/04 (2006.01)
  C02F 103/34 (2006.01)

(52) U.S. Cl.
  CPC .............. *C02F 1/441* (2013.01); *C02F 1/444* (2013.01); *C02F 1/4695* (2013.01); *C02F 1/66* (2013.01); *C02F 2103/04* (2013.01); *C02F 2103/346* (2013.01); *C02F 2209/001* (2013.01); *C02F 2209/003* (2013.01); *C02F 2209/20* (2013.01)

(58) Field of Classification Search
  USPC .......................................................... 210/96
  See application file for complete search history.

(56) References Cited

U.S. PATENT DOCUMENTS

| | | | |
|---|---|---|---|
| 3,955,794 A | 5/1976 | Hankosky | |
| 4,413,651 A | 11/1983 | Goans | |
| 4,671,490 A | 6/1987 | Kolenc et al. | |
| 4,732,363 A | 3/1988 | Kolenc et al. | |
| 4,800,912 A | 1/1989 | Hafner et al. | |
| 4,815,697 A | 3/1989 | Skoda | |
| 4,846,440 A | 7/1989 | Carlson et al. | |
| 4,915,353 A | 4/1990 | Danko | |
| 5,082,237 A | 1/1992 | Ayvaz | |
| 5,083,750 A | 1/1992 | Balik | |
| 5,167,470 A | 12/1992 | Bertolozzi et al. | |
| 5,215,286 A | 6/1993 | Kolenc | |
| 5,297,728 A | 3/1994 | Yano et al. | |
| 5,335,691 A | 8/1994 | Kolenc | |
| 5,478,012 A | 12/1995 | Fujiwara et al. | |
| 5,485,984 A * | 1/1996 | Itoi | F16K 7/16 251/331 |
| 5,516,078 A | 5/1996 | Wellener, III et al. | |
| 5,624,102 A | 4/1997 | Nishimura et al. | |
| 5,669,596 A | 9/1997 | Yoshikawa et al. | |
| 5,730,171 A | 3/1998 | Niakan | |
| 5,738,335 A | 4/1998 | Coutu | |
| 5,743,513 A | 4/1998 | Yoshikawa et al. | |
| 5,881,997 A | 3/1999 | Ogawa et al. | |
| 5,984,267 A | 11/1999 | Coutu | |
| 6,092,550 A | 7/2000 | Gotch et al. | |
| 6,123,320 A | 9/2000 | Rasanow et al. | |
| 6,367,776 B1 | 4/2002 | Lippert et al. | |
| 6,474,560 B2 | 11/2002 | Minowa et al. | |
| 6,732,996 B1 | 5/2004 | Kremer | |
| 7,377,483 B2 | 5/2008 | Iwabuchi et al. | |
| 7,452,192 B2 | 11/2008 | Hirota | |
| 7,828,010 B2 | 11/2010 | Diesing et al. | |
| 8,062,612 B2 | 11/2011 | McAvoy et al. | |
| 8,092,761 B2 | 1/2012 | McAvoy et al. | |
| 8,104,515 B2 | 1/2012 | Unger | |
| 8,123,192 B2 | 2/2012 | Maltezos et al. | |
| 8,307,846 B2 | 11/2012 | Yanagisawa et al. | |
| 2003/0042459 A1 * | 3/2003 | Gregoire | F16K 7/14 251/331 |
| 2005/0171490 A1 | 8/2005 | Weaver et al. | |
| 2007/0045587 A1 | 3/2007 | Kolenc et al. | |
| 2007/0090321 A1 | 4/2007 | Bork | |
| 2008/0142091 A1 | 6/2008 | Meinig et al. | |
| 2008/0251742 A1 | 10/2008 | Ise et al. | |
| 2009/0242818 A1 | 10/2009 | Leys et al. | |
| 2010/0200071 A1 | 8/2010 | Morgan | |
| 2011/0114868 A1 | 5/2011 | Warren et al. | |
| 2011/0274566 A1 | 11/2011 | Amirouche et al. | |
| 2011/0290347 A1 | 12/2011 | Diesing et al. | |
| 2011/0308655 A1 * | 12/2011 | Keeper | F16K 7/16 138/89 |
| 2012/0097880 A1 | 4/2012 | Boettcher et al. | |
| 2012/0172739 A1 | 7/2012 | Kern | |
| 2013/0055889 A1 | 3/2013 | Herz et al. | |
| 2014/0217321 A1 | 8/2014 | Glime | |

* cited by examiner

DIAPHRAGM VALVE WITH DIAPHRAGM SEAT CARRIER

CROSS-REFERENCE TO RELATED APPLICATIONS

This application is a continuation application of pending U.S. patent application Ser. No. 14/169,298 for DIAPHRAGM VALVE WITH WELDED DIAPHRAGM SEAT CARRIER, filed Jan. 31, 2014, which claims the benefit of U.S. Provisional Patent Application Ser. No. 61/759,705 for DIAPHRAGM VALVE WITH WELDED DIAPHRAGM SEAT CARRIER, filed on Feb. 1, 2013, the entire disclosures of both of which are fully incorporated herein by reference.

TECHNICAL FIELD

The disclosure relates generally to valves and more particularly to diaphragm valves.

BACKGROUND OF THE DISCLOSURE

Valves are commonly used to control fluid flow. Diaphragm valves are an example of a flow control valve that are used in many industries to control the flow of gas, liquid and other fluids. Basic diaphragm valves operate to close off flow by moving a diaphragm into contact with a valve seat. The diaphragm and valve seat may be wear items that need to be occasionally replaced during the service life of the valve.

SUMMARY OF THE DISCLOSURE

In one embodiment, a diaphragm valve includes a valve body, a valve assembly, a threaded member, and a valve actuator. The valve body includes a valve cavity, a first port and a second port, with the first port and the second port being open to the valve cavity. The valve assembly is disposed to seal the valve cavity, the valve assembly including a valve seat, a seat carrier and a diaphragm, the valve seat being retained with the seat carrier and being disposed to surround the first port. The threaded member is assembled with the valve body and includes an annular bead that directly contacts the diaphragm to apply a compressive load to the diaphragm against a first side of the seat carrier. The valve actuator is assembled with the valve body and operable to move a surface of the diaphragm into and out of contact with the valve seat. The valve actuator is separate from the threaded member, and is removable from the valve body without removing the threaded member from the valve body.

In another embodiment, a diaphragm valve includes a valve body, a valve assembly, a threaded member, and a valve actuator. The valve body includes a valve cavity, a first port and a second port, with the first port and the second port being open to the valve cavity. The valve assembly is disposed to seal the valve cavity, the valve assembly including a valve seat, a seat carrier and a diaphragm, the valve seat being retained with the seat carrier and being disposed to surround the first port. The valve actuator is assembled with the valve body and includes an actuator stem operable to move a surface of the diaphragm into and out of contact with said valve seat. The threaded member has an external threaded portion threadingly assembled with the valve body and an aperture through which the actuator stem extends. The aperture includes an internal threaded portion threadingly assembled with the valve actuator. The threaded member includes an annular bead that directly contacts the diaphragm to apply a compressive load to the diaphragm against a first side of said seat carrier. The valve actuator is removable from the valve body without reducing the compressive load applied to said diaphragm by the threaded member.

These and other inventive concepts and additional aspects and advantages of the various embodiments set forth herein will be readily understood and appreciated by those skilled in the art from the following detailed description and the accompanying drawings.

DESCRIPTION OF THE EXEMPLARY EMBODIMENTS

Diaphragm valves are used as flow control devices for gas and liquid fluids. In the semiconductor industry, for example, process system gases are controlled using diaphragm valves. A diaphragm valve may be installed into a process system in many different ways, including being mounted on manifolds or substrates that use surface mount technology. In order to reduce the footprint of tools that use such valves, diaphragm valves are being designed to be contained within ever smaller valve bodies. The present inventions may be used, for example, to realize an exemplary valve that fits within a 20 millimeter footprint (400 square millimeters) on a surface mount manifold, while still achieving a relatively high flow capacity of about 0.2 Cv, for example. Present state of the art is a footprint of about 28.5 mm (812 square millimeters). The present inventions also provide for a valve that can easily be refurbished; wherein important wear components such as the diaphragm and valve seat are combined into a subassembly or cartridge that can be conveniently removed and replaced either at the manufacturing site or in the field.

Figure 1:
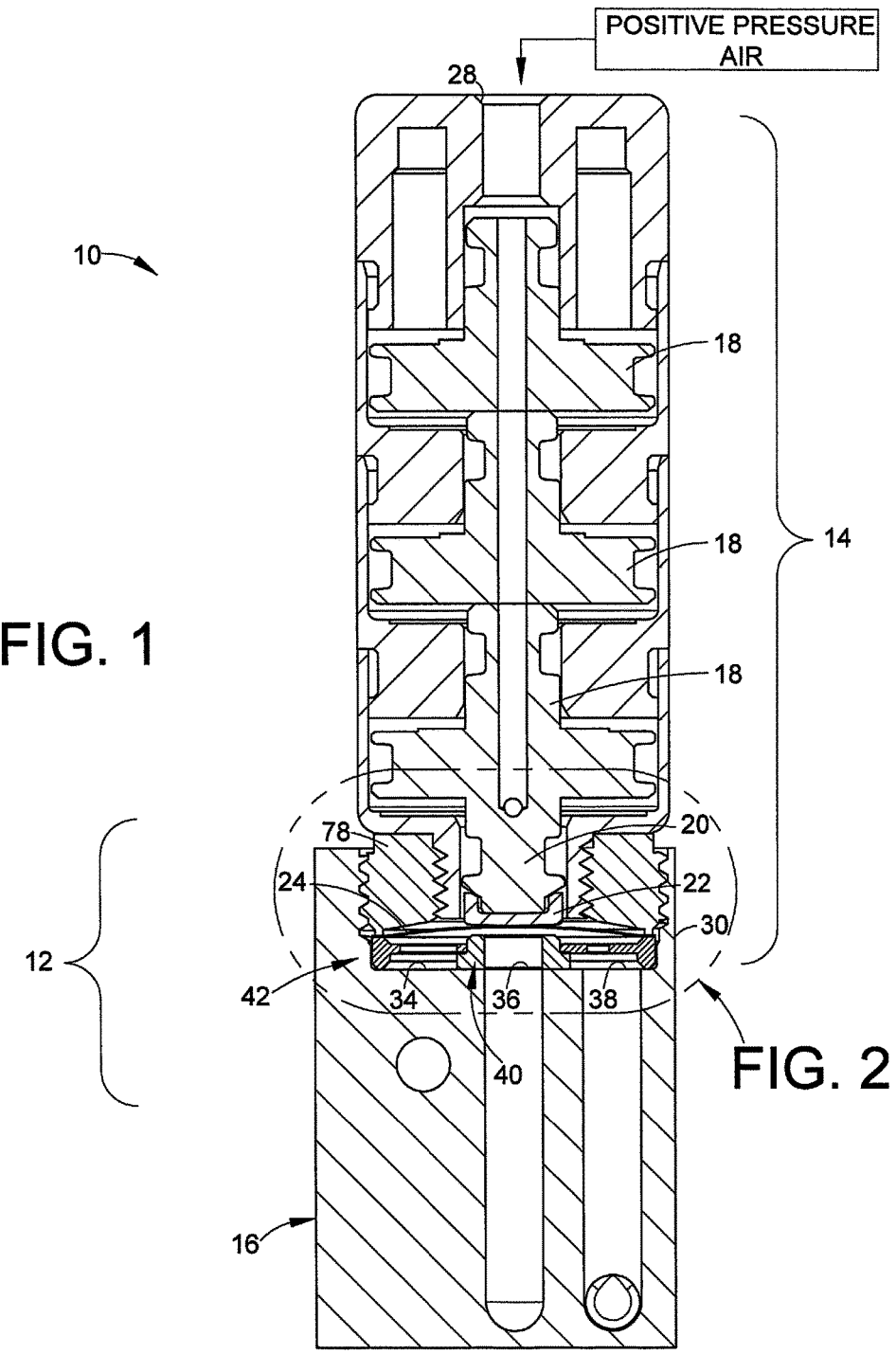
FIG. 1 illustrates a diaphragm valve and actuator assembly in longitudinal cross-section and in accordance with the teachings herein.
Figure 2:
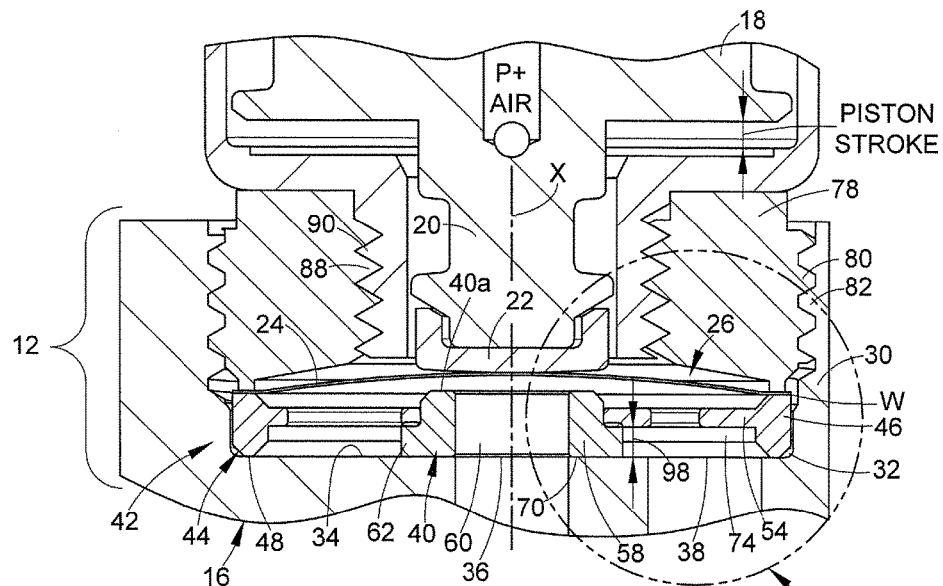
FIG. 2 is an enlarged view of the circled portion of FIG. 1.

With reference to FIGS. 1 and 2, in an embodiment, a diaphragm valve and actuator assembly 10 includes a diaphragm valve 12 and an actuator 14. The diaphragm valve 12 may be configured for assembly onto a substrate or manifold 16. The manifold 16 may include additional mounting sites for additional valves or other components (see FIG. 5). Alternatively, the diaphragm valve and actuator assembly 10 may be a standalone assembly that uses a surface mount configuration on a substrate. But, a surface mount configuration or a manifold configuration are not required, and alternatively the diaphragm valve 12 may be installed into other flow control systems with appropriate porting as needed.

The actuator 14 in this case may be a pneumatic actuator in which pressurized gas forces one or more actuator pistons 18 axially to move an actuator stem 20. The actuator stem 20 optionally contacts a button 22 that contacts the non-wetted side or surface 24 of a diaphragm 26 (FIG. 2). Pressurized gas may be provided to an air inlet 28 of the actuator 14 in a known manner. The actuator 14 forms no part of the present disclosure other than as an exemplary means to open and close the diaphragm valve 12. Many different actuator designs and configurations may be used as needed. For surface mount configurations, the actuator 14 typically is positioned or stacked on top of the diaphragm valve 12 as shown in the exemplary embodiment herein. Valves as taught herein may alternatively be used with manual actuators.

Figure 3:
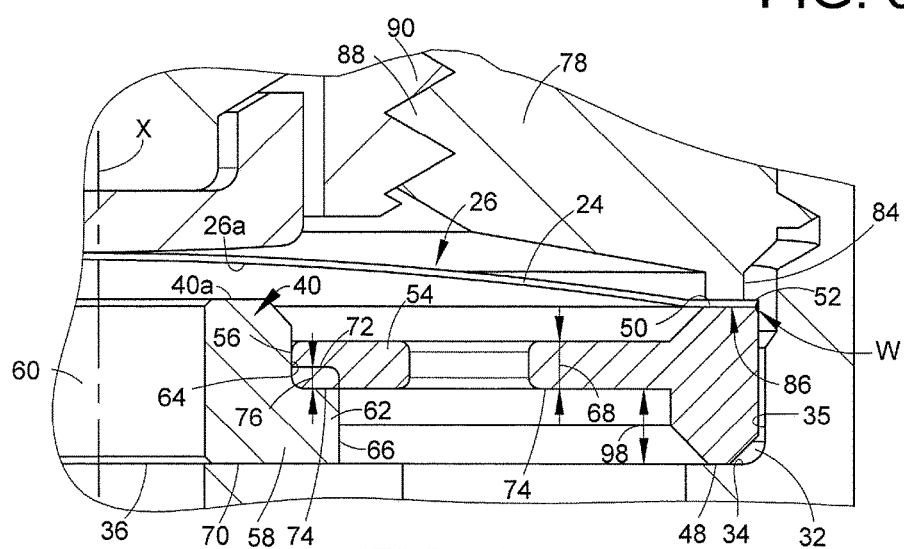
FIG. 3 is an enlarged view of the circled portion of FIG. 2.

The diaphragm valve 12 includes a valve body 30. The valve body 30 may be a standalone component, but in the exemplary embodiment herein the valve body 30 may be formed as part of the substrate 16. The valve body 30 includes a valve cavity 32 that is defined by a surface, for example a recessed surface or trepan 34 and a right cylindrical wall 35 (FIG. 3). A first port 36 and a second port 38 may be provided in the recessed surface 34. A valve seat 40 surrounds the first port 36 which preferably but not necessarily is disposed in the center of the recessed surface 34. When the diaphragm 26 is moved into sealing contact with the valve seat 40 by operation of the actuator 14, the diaphragm valve 12 is in a closed position, and when the diaphragm 26 moves out of contact from the valve seat 40 the diaphragm valve 12 is in an open position. Flow may be from the first port 36 serving as an inlet port to the second port 38 serving as an outlet port, however, flow direction may also be reversed.

Movement of the diaphragm 26 is controlled by operation of the actuator 14 that in response to pressurized gas moves the actuator stem 20 and the optional button 22 toward and away from the diaphragm 26 so as to close and open the diaphragm valve 12. To close the diaphragm valve 12, the actuator stem 20 deflects the diaphragm 26 into contact with the valve seat 40 such that fluid flow between the first port 36 and the second port 38 is blocked. To open the diaphragm valve 12, the actuator stem 20 moves away from the diaphragm 26 which allows the diaphragm 26 to move out of sealing contact with the valve seat 40 such that fluid flow between the first port 36 and the second port 38 is permitted. The diaphragm 26 may be a domed diaphragm that in its natural state will return to a position that is away from the valve seat 40. The diaphragm may be a single piece metal diaphragm or alternatively may be made of multiple layers of metal. The first and second ports 36, 38 may act as an inlet or outlet port respectively or vice-versa as needed.

In accordance with an embodiment of another of the inventive concepts of the present disclosure, the diaphragm 26 and the valve seat 40 are combined as a discrete valve assembly 42. As an example, the valve assembly 42 may be utilized as a replaceable valve subassembly or cartridge for a diaphragm valve. In another embodiment and with reference to FIGS. 2, 3 and 4, an annular seat carrier 44 may be a disk-like part having an outer rim 46. The outer rim 46 is of sufficient diameter so as to encircle the first port 36 and the second port 38. The outer rim 46 presents a first surface 48 that forms a compressed body seal in the form of a face seal against the recessed surface 34. The outer rim 46 presents a second surface 50 that faces opposite the first surface 48. The diaphragm 26 includes a peripheral edge portion 52 that may be welded as along a weld W to the second surface 50 of the outer rim 46. A suitable known welding process is high travel speed laser welding to name one example. The compressed body seal allows the valve assembly 42 to be removed easily and installed easily with the diaphragm valve 12.

The seat carrier 44 further includes a web 54 that extends radially inwardly from the outer rim 46. The web 54 is provided with a central opening or hole 56. Preferably but not necessarily the web 54 is generally planar or flat and may have a thickness that is less than the axial height of the outer rim 46. When the valve assembly 42 is installed in the valve cavity 32, the central opening 56 preferably aligns coaxially with the first port 36. For reference purposes, axial refers to the longitudinal axis X of the valve seat 40 as represented in FIGS. 2 and 3.

The valve seat 40 is supported by the web 54 to be in a position that is preferably coaxial with the first port 36. The valve seat 40 may include an annular seat body 58 with a central flow passage 60 therethrough. The central flow passage 60 may be preferably aligned with the axis X. The valve seat body 58 may be shaped generally as a cylinder or ring with a lower end flange 62 at one end of the valve seat body 58. The valve seat body 58 may have a circumferential wall 64 that extends axially from the flange 62 and has a diameter sized to be received closely in and extend through the central opening 56 in the web 54. Preferably, the seat body circumferential wall 64 is cylindrical as is the wall that defines the central opening 56 so that an interference fit may be used to retain the valve seat 40 with the seat carrier 44. Alternatively, an upper portion of the valve seat 40 may include a radially extending outward lip (not shown) that snaps through the central opening of the web 54 to more loosely retain the valve seat 40 with the seat carrier 44. The flange 62 has a circumferential wall 66 with a diameter that is greater than the diameter of the central opening 56 of the web 54. The web 54 preferably has a thickness 68 (FIG. 3) which allows the web 54 to be flexible. This flexible web allows the valve seat 40 to be snapped or pushed into position so as to be supported by the seat carrier 44. The valve seat 40 includes an upper surface 40*a* that presents a seal surface against which a wetted surface 26*a* of the diaphragm 26 is pressed by operation of the actuator 14 in order to close the valve 12.

The lower surface 70 of the flange 62 will contact and seal against the recessed surface 34 of the valve body when the seat carrier 44 is installed in the valve 12. Preferably an upper surface 72 of the flange 62 contacts a lower surface 74 of the web 54. The thickness or axial length of the flange 62 along with the gap (98) may be selected so that there is an interference fit (represented by the overlap 76 in FIG. 3) between the web 54 lower surface 74 and the flange upper surface 72 when the valve assembly is fully installed into the valve cavity 32. Because the web 54 has some flexibility, the web 54 will deflect upward with a spring-like action so as to apply a downward bias against the flange 62 to help hold the valve seat 40 in place against the recessed surface 34 to form a seat seal when the diaphragm 26 is in the valve open position. When the valve is closed, the actuator applied force presses the diaphragm against the valve seat upper surface 40*a* and produces a seat seal between the lower surface 70 of the flange and the recessed surface 34 of the valve body.

As noted, the bias of the web 54 against the valve seat flange 62 helps maintain a seat seal between the lower surface 70 of the flange and the recessed surface 34 of the valve body when the valve is in an open position. The bias may be realized in an embodiment by preferably designing the seat carrier 44 having a flexible web 54 to flex in a spring-like manner. When the seat carrier 44 is installed into the valve cavity 32 and clamped into position (described below), the axial interference between the flange 60 of the seat carrier 44 and the contacting lower surface 74 of the web 54 will cause the web 54 to deflect or displace upward slightly (this displacement may be only a few thousandths of an inch and is too small to discern at the scale of the drawings herein). This deflection is due in part to the web being anchored or fixed at its outer periphery to the outer rim 46, and preferably is an elastic deflection so that the web 54 applies a bias force against the valve seat 40 to maintain a seat seal against the recessed surface 34 when the valve is in an open position. This bias can serve as a live or dynamic load to accommodate relative thermal expansion and material deformation characteristics, for example, of the valve seat 40 (e.g. polymer material), the diaphragm 26 and the seat carrier 44 (the latter two which may be metal and not necessarily the same metal.) Maintaining a seat seal against the valve body (the recessed surface 34, for example) may be useful in applications in which flow capacity is purposely controlled to a value that is less than maximum flow capacity (for example, using a flow restriction device with the valve seat 40 as is known). If the valve seat 40 were able to lift off the recessed surface 34 when the valve is open, then fluid flow could bypass the restriction. For valves that will operate under full flow, the seat seal may not be a significant consideration when the valve is in an open position.

A way to understand the nature of the flex of the web 54 is to think of it in terms of a spring rate. By thinning the web 54 or removing material that allows it to have more displacement at a lower load the seat carrier 44 can exhibit some "springiness". Traditional designs are bulkier or thicker and as a result too stiff. At approximately 100 lbs of resistance force that the valve seat 40 can sustain a traditional stiff non-flexible web will displace less than 0.001" of flex which displacement is not enough to accommodate thermal expansion mismatch. The flexibility of the web 54 may be determined by a number of factors and variables, including but not limited to one or more of: the material of the web, the thinness of the web, geometric and dimensional features that may be used to provide flex, and so on.

In accordance with the teachings herein, in an embodiment, the web 54 may be designed to exhibit a Belleville-type spring action from the web that induces a delivered load to the valve seat 40 of between approximately 50 and 100 lbs at a deflection of approximately 0.005". This example equates to an effective spring rate of about 20,000 lbs per inch. The spring rate selected will depend on the particular valve design and operational needs, but for many valves the effective spring rate of the seat carrier 44—relative to its central displacement along the axis X from a central load (e.g. where the web 54 contacts the valve seat flange 62) and fixed periphery—may be under 100,000 lbs per inch and more preferably under 80,000 lbs per inch. The spring rate considers all geometric and material variables that can be leveraged to produce a desired flex.

The seat carrier outer rim 46 preferably has a diameter such that the seat carrier 44 is closely received in the valve cavity 32. This allows the seat carrier 44 to self-align so that the central flow passage 60 of the valve seat 40 is coaxially aligned with the first port 36.

As noted above, the diaphragm 26 may be welded or otherwise secured to the seat carrier 44 to form a fluid tight seal. With the valve seat 40 installed and retained with the seat carrier 44, the combined diaphragm 26, seat carrier 44 and valve seat 40 form the valve assembly 42 that can be easily replaced as a unified subassembly or cartridge for maintenance and repair of the valve 12.

At this point it should be noted that the valve assembly 42 is an embodiment of what is in effect a unitary subassembly or cartridge that provides a replaceable and easily installed self-contained valve mechanism and flow cavity for a diaphragm valve. The assembly 42 provides a valve mechanism in the form of the diaphragm 26, a valve closure mechanism in the form of the valve seat 40, and a fluid flow cavity that is sealed on one side of the seat carrier 44 by the welded diaphragm 26 and on an opposite side of the seat carrier by the valve body 30 in the form of the recessed surface 34 when the valve assembly 42 is fully seated and clamped into the valve body (as described below). The assembly 42 may be dimensioned so as to sealingly contain the fluid flow path between the first port 36 and the second port 38 after assembly. This provides a simple and easy structure by which the common wear items of the diaphragm and the valve seat can be easily replaced, especially as a field replacement or repair operation. Unlike conventional diaphragm valves having discrete diaphragm and valve seat installation, the present inventions provide a unitary structure such that the valve seat and diaphragm are properly aligned at the time of assembly of the cartridge, for example at the manufacturing site. This removes the opportunity for misalignment of the valve seat or the diaphragm that could otherwise occur in the conventional designs during replacement of discrete parts, particularly in the field, due to their separate installation.

In order to securely mount the seat assembly 42 in the valve cavity 32, in an embodiment an annular nut 78 or other suitable retainer includes outer threads 80 that provide a threaded connection with internal threads 82 of the valve body 30. The nut 78 may be tightened down near the periphery of the valve assembly 42. This compresses the first surface 48 of the outer rim 46 against the recessed surface 34 of the valve body to form the body seal noted hereinabove. As best illustrated in FIG. 3, the nut 78 includes a bead 84 that is dimensioned to contact the diaphragm non-wetted surface 24 in the area marked 86 inboard of the peripheral weld W. The nut 78 applies a compressive load against the diaphragm 26 which is sandwiched between the bead 84 and the second surface 50 of the outer rim 46 of the seat carrier 44 when the nut 78 is tightened down into the valve cavity 32. This load is applied preferably inboard of the weld W and thus may be used to isolate the weld W from stresses that occur during flexing and movement of the diaphragm 26 when the valve is open and closed. Because the nut bead 84 applies a load on the valve assembly 42 to both clamp the diaphragm and to create the body seal, it is preferred that the location of the bead 84 be selected so that it is inboard of the weld W but will prevent or reduce distortion of the seat carrier 44 when the nut 78 is tightened into the valve body 30. Because a compressive load is used to form the body seal, the valve assembly as a unit or cartridge can be easily removed from the diaphragm valve 12 after the nut 78 is removed.

The nut 78 may also be provided with inner threads 88 that mate with threads 90 of the actuator 14 in order to install the actuator 14 on the valve body 30.

Figure 4:
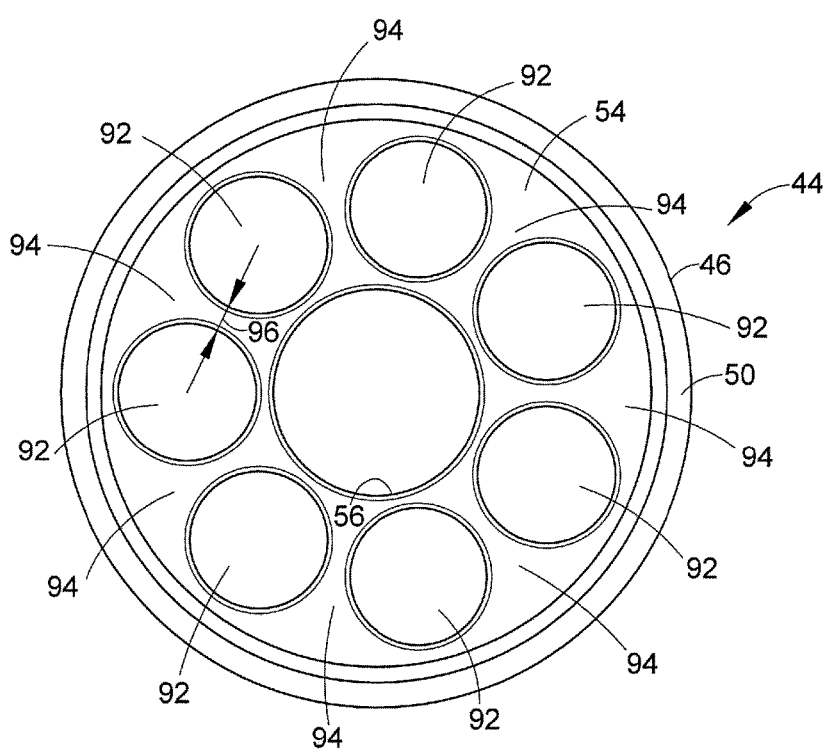
FIG. 4 is a plan view of an exemplary seat carrier used in the embodiment of FIG. 1.

With reference to FIG. 4, the seat carrier 44 may include additional flow passages 92 formed in the web 54. These flow passages 92 preferably are evenly distributed about the central opening 56. In order for fluid to flow between the first port 36 and the second port 38, the fluid will pass through some or all of the additional flow passages 92. The additional flow passages 92 therefore help provide a higher flow capacity for the valve 12. Preferably the additional flow passages 92 are large enough so that they are separated from each other by lands 94 that each have a dimension 96 between adjacent pairs of flow passages 92—in the portion of each land 94 that may overlay the second port 38 depending on the angular position of the web 54 when the assembly 42 is installed into the diaphragm valve—that is smaller than the diameter of the second port 38. Preferably, the dimension 96 will be less than half the diameter of the second port 38 and more preferably may be less than ⅕ the diameter of the second port 38. This allows the seat assembly 42 to be installed in any random radial or angular orientation regardless of whether a land 94 could overlay the second port 38. Because each land 94 preferably has a dimension 96 that is smaller than the second port 38 diameter, an overlaying land 94 will not adversely reduce fluid flow capacity of the valve 12. The use of smaller lands 94 including at the dimension 96 facilitates using larger flow passages 92 which increases the flow capacity of the valve assembly 42 and hence the diaphragm valve 12.

To further provide higher flow capacity, the seat carrier 44 may be dimensioned such that when installed into the valve cavity 32 there is a standoff or gap 98 between the lower surface 74 of the web 54 and the recessed surface 34 of the valve body. This gap 98 may be provided in an embodiment by positioning the web 54 above the axial midpoint of the outer rim 46 (see FIG. 2). This gap 98 preferably is made large enough to provide higher flow rates of the fluid passing between the first port 36 and the second port 38 through the additional flow passages 92 when the valve is open. The web 54 presents a surface area in between the flow passages 92 around which fluid must flow to the second port 38 through the flow passages 92. In order to increase flow capacity, it is preferred that the flow area, as defined by the height of the gap 98 times the radial dimension or width of the lands 94 (the width being defined along an axis perpendicular to the line 96 in FIG. 4) be approximately the same as the flow area of the second port 38 or greater. The gap 98 also helps compensate should a land 94 overlay the second port 38 by providing additional flow space between the second port 38 and the additional flow passages 92. By way of example, the gap 98 may be sized so as to provide a flow area that is defined by the space between the seat carrier web 54 and the valve body recessed surface 34 (when viewed in cross-section), that is comparable or larger than the first port 36 square area. As another alternative, the gap 98 may be made larger by extending the axial length of the lower portion of the outer rim 46 that extends below the web 54. As another alternative, a groove, trench or recess may be machined into the recessed surface or trepan 34. A flat rim or shoulder could then be used for the seat carrier first surface 48 to bear against and provide the body seal.

For example, suppose the second port has a flow area of 0.018 in$^2$. Then preferably the flow area between the web 54 (more specifically the lower surface 74 of the web 54) and the valve body recessed surface 34 should be approximately the same or larger—for example, the flow area may be realized with a width of 0.18 inches and a gap 98 may be 0.1 inches so that 0.18 in times 0.1 inches equals a flow area of 0.018 in$^2$.

Figure 5:
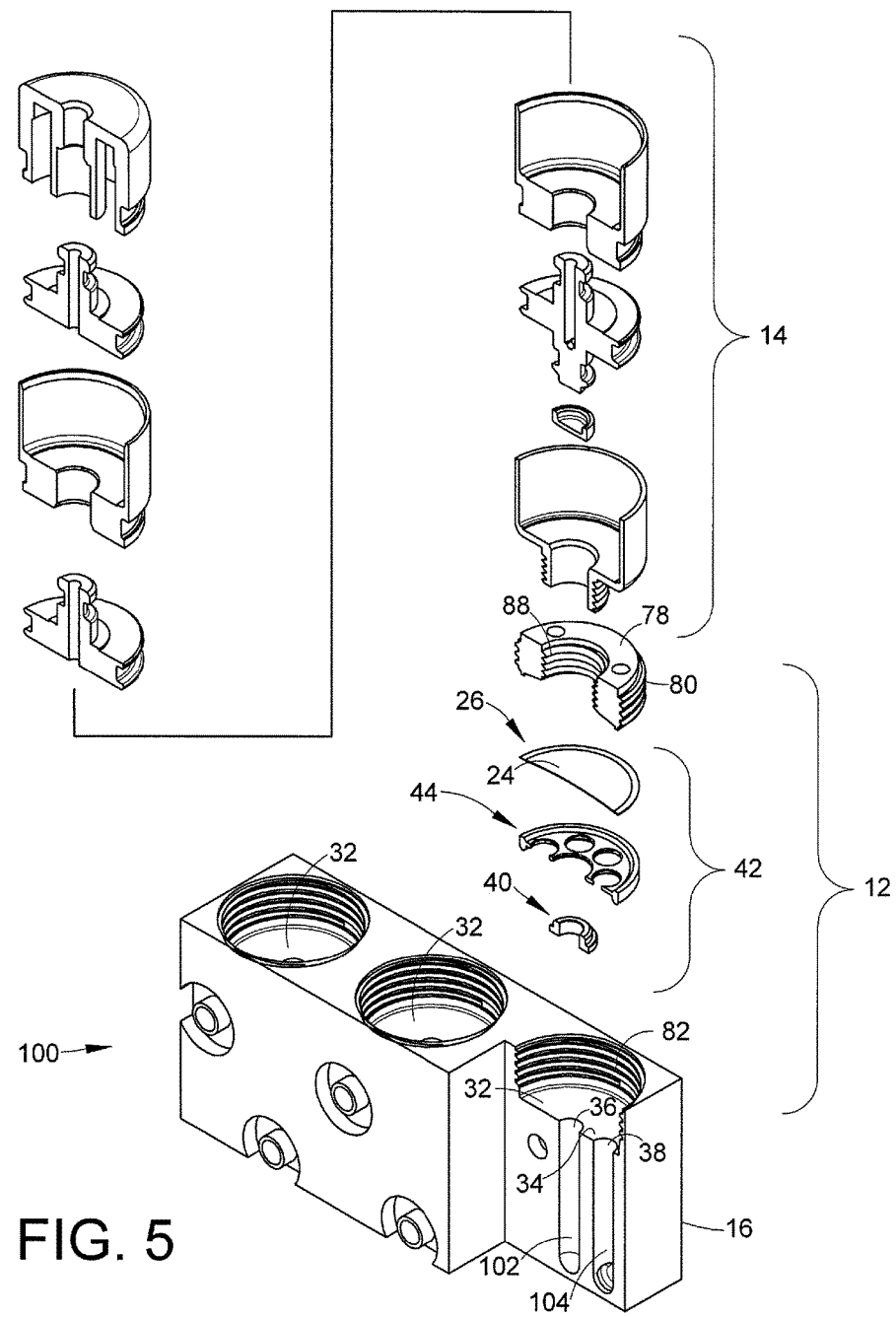
FIG. 5 illustrates a manifold for two or more diaphragm valve and actuator assemblies, shown in exploded perspective and partial cross-section.

With reference to FIG. 5, the diaphragm valve and actuator assembly 10 (shown in exploded cross-section) may be installed on a manifold 100 (which may be the manifold 16 in FIG. 1). In this example, the manifold 100 may be side ported with first and second manifold flow passages 102, 104 for fluid flow into and out of the first port 36 and the second port 38 of the valve 12. The exemplary manifold 16 (FIG. 1) and the manifold 100 of FIG. 5 incorporate surface mount technology in that the first port 36 and the second port 38 of the valve 12 are coplanar in the valve cavity 32. Other porting configurations and valve body configurations may be used as needed for particular applications.

In accordance with another inventive concept, methods of installing and replacing a diaphragm or valve seat or both in a diaphragm valve are provided. In an embodiment, a method for installing a diaphragm or valve seat or both may include the steps of: 1) forming a valve assembly having a valve seat, a seat carrier and a diaphragm by attaching the diaphragm to the seat carrier by welding a periphery of the diaphragm to an outer rim of the seat carrier; 2) retaining the valve seat with the seat carrier and the welded diaphragm; and 3) installing the valve assembly into a valve body.

In another embodiment, a method for replacing a diaphragm or valve seat or both may include the steps of: 1) forming a replacement valve assembly comprising a valve seat, a seat carrier and a diaphragm by attaching the diaphragm to the seat carrier by welding a periphery of the diaphragm to an outer rim of the seat carrier, 2) retaining the valve seat with the seat carrier and the welded diaphragm, 3) removing from a valve body a prior valve assembly, and 4) replacing the prior valve assembly with the replacement valve assembly. This method may optionally be combined with the method for installing a diaphragm, valve seat or both into the valve body, wherein the installed valve assembly is subsequently replaced using the method for replacing a diaphragm or valve seat or both as just described.

For both the method of installation and the method of replacing, each method may include the step of applying a load on the valve assembly in the valve body to form a body seal by compressing a surface of the seat carrier against a surface of the valve body.

The inventive aspects and concepts have been described with reference to the exemplary embodiments. Modification and alterations will occur to others upon a reading and understanding of this specification. It is intended to include all such modifications and alterations insofar as they come within the scope of the appended claims or the equivalents thereof.

I claim:
1. A diaphragm valve, comprising:
   a valve body comprising a valve cavity, a first port and a second port, said first port and said second port being open to said valve cavity;
   a valve assembly disposed to seal said valve cavity, said valve assembly comprising a valve seat, a seat carrier and a diaphragm comprising a domed disk, said valve seat being retained with said seat carrier and being disposed to surround said first port;
   a threaded member assembled with the valve body and including an annular bead that directly contacts an outer periphery of the domed disk to apply a compressive load to said diaphragm against a first side of said seat carrier; and
   a valve actuator that is assembled with the valve body and operable to move a surface of said diaphragm into and out of contact with said valve seat, wherein the valve actuator is separate from the threaded member, and wherein the valve actuator is removable from the valve body without removing the threaded member from the valve body.

2. The diaphragm valve of claim 1, wherein the valve actuator is secured to the valve body by the threaded member.

3. The diaphragm valve of claim 1, wherein the threaded member comprises an interior threaded portion.

4. The diaphragm valve of claim 1 wherein the valve actuator is threadably assembled with the interior threaded portion of the threaded member.

5. The diaphragm valve of claim 1, wherein the diaphragm is attached to the first side of the seat carrier.

6. The diaphragm valve of claim 1, wherein the diaphragm is welded to the first side of the seat carrier.

7. The diaphragm valve of claim 1 wherein said seat carrier comprises an annular body having an outer rim and a web that extends radially inward from said outer rim to a central opening, said central opening being aligned with said first port when said valve assembly is installed in said valve body.

8. The diaphragm valve of claim 7 wherein said web comprises a plurality of flow passages separated by lands about said central opening.

9. The diaphragm valve of claim 8 wherein each said land between adjacent pairs of said flow passages has a surface area that is less than a cross-sectional area of said second port so as to reduce obstruction of flow when said land overlays said second port.

10. The diaphragm valve of claim 7 wherein said valve seat is retained with said seat carrier by an interference fit between a circumferential wall of said valve seat and a wall of said web that defines said central opening.

11. The diaphragm valve of claim 7 wherein said web is flexible so that said web biases a surface of said valve seat that faces away from said diaphragm into contact with a seal surface of said valve body that surrounds said first port.

12. The diaphragm valve of claim 7 wherein said web is generally planar and has a spring rate of less than 100,000 lbs/in.

13. The diaphragm valve of claim 7, wherein the web applies a load between approximately 50 pounds and 100 pounds between the valve seat and the seal surface.

14. The diaphragm valve of claim 1 wherein said diaphragm comprises a domed circular disk that is attached to said seat carrier by a weld about a periphery of said domed circular disk, said diaphragm being compressed between said annular bead of said threaded member and a surface on said first side of said seat carrier.

15. The diaphragm valve of claim 1 wherein said second port is provided in a surface of said valve body that defines said valve cavity, said seat carrier comprises an annular body having an outer rim and a web that extends radially inward from said outer rim to a central opening, said web being disposed to provide a gap between a lower surface of said web and said surface of said valve body.

16. The diaphragm valve of claim 15 wherein said gap presents a flow area that is approximately the same or greater than a flow area of said second port.

17. The diaphragm valve of claim 1 wherein said diaphragm comprises stainless steel, said seat carrier comprises stainless steel, and said valve seat comprises a polymer or plastic.

18. The diaphragm valve of claim 1 wherein said valve seat comprises a flow passage in fluid communication with said first port.

19. The diaphragm valve of claim 1, wherein the valve actuator is removable from the valve body without reducing the compressive load applied to said diaphragm by the threaded member.

20. A diaphragm valve, comprising:
a valve body comprising a valve cavity, a first port and a second port, said first port and said second port being open to said valve cavity;
a valve assembly disposed to seal said valve cavity, said valve assembly comprising a valve seat, a seat carrier and a diaphragm, said valve seat being retained with said seat carrier and being disposed to surround said first port;
a valve actuator that is assembled with the valve body and including an actuator stem operable to move a surface of said diaphragm into and out of contact with said valve seat; and
a threaded member having an external threaded portion threadingly assembled with the valve body and an aperture through which the actuator stem extends, the aperture including an internal threaded portion threadingly assembled with the valve actuator, the threaded member including an annular bead that directly contacts the diaphragm to apply a compressive load to said diaphragm against a first side of said seat carrier;
wherein the valve actuator is removable from the valve body without reducing the compressive load applied to said diaphragm by the threaded member.

21. The diaphragm valve of claim 20, wherein the diaphragm comprises a domed circular disk, wherein the annular bead of the threaded member directly contacts an outer periphery of the domed circular disk.

* * * * *